Patented July 24, 1951

2,562,107

UNITED STATES PATENT OFFICE 2,562,107

DERIVATIVES OF ORGANIC AMINO ALCOHOLS AND METHODS FOR OBTAINING THE SAME

Loren M. Long, Grosse Pointe Woods, Mich., assignor to Parke, Davis & Company, Detroit, Mich., a corporation of Michigan No Drawing. Application September 24, 1949, Serial No. 117,711

8 Claims. (Cl. 260—490)

This application is a continuation-in-part of my co-pending application Serial No. 15,254, filed March 16, 1948, now abandoned, and the invention relates to derivatives of organic amino alcohols and to methods for obtaining the same. More particularly, the invention relates to ketonic amino alcohol compounds having the general formula,

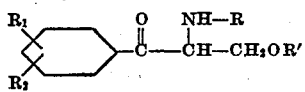

and to the production of amino diol products of formula,

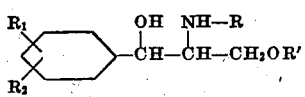

therefrom, where R is hydrogen or an acyl radical, $R_1$ and $R_2$ are the same or different and represent hydrogen, halogen, lower alkyl or lower alkoxy radicals and R' is hydrogen or an acyl radical. The term "acyl" as used herein includes lower aliphatic acyl, halogen substituted lower aliphatic acyl, benzoyl, substituted benzoyl, araliphatic acyl and the like acyl radicals.

In accordance with the invention an ω-acyl-amino acetophenone derivative is condensed with formaldehyde in the presence of an alkaline condensation catalyst to obtain a ketonic compound of formula,

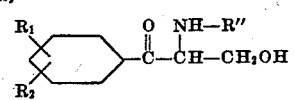

which is either converted to the corresponding amino diol by reduction or acylated to obtain an acyl derivative of formula,

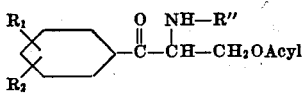

which is then reduced to the corresponding amino monoacylated diol compound, where R" is an acyl radical and $R_1$ and $R_2$ have the same significance as given above. These transformations may be diagrammatically illustrated as follows.

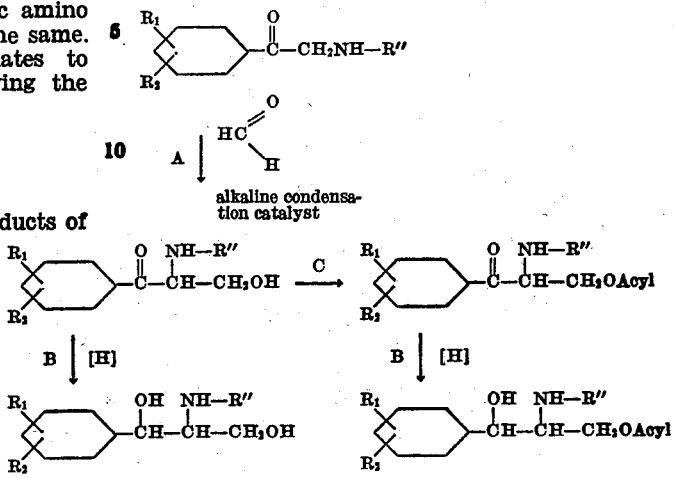

It will be readily appreciated by those skilled in the art that the amino diol compounds of the invention exist in structural as well as optical isomeric forms. The term "structural" isomer or form as used herein refers to the cis or trans, that is, the planar relationship of the polar groups on the two asymmetric carbon atoms. Since some of the isolation procedures hereinafter described lead to the separation of these diastereo isomers, the products having the cis structural form will hereinafter be referred to as the "regular" form to differentiate them from the trans or "pseudo" structural form. Such cis compounds are products wherein the two most highly polar of the groups on the two asymmetric carbon atoms lie on the same side of the plane of the two carbon atoms. Conversely, the trans or pseudo compounds are those wherein the two most highly polar groups lie on opposite sides of the plane of the two carbon atoms. In the absence of any such designation of the structural form, the product is the unresolved mixture of the two structural forms.

In carrying out the condensation designated as A in the above diagram the formaldehyde may be supplied to the reaction mixture in a number of different forms. For example, formaldehyde gas, aqueous or alcoholic solutions of formaldehyde, paraformaldehyde and other formaldehyde-yielding polymers may be used. In most cases it has been found preferable to use an excess of formaldehyde, usually up to about four or five mols, in order to insure completeness of the condensation reaction.

A variety of solvents, alkaline condensation catalysts and reaction conditions may also be employed. As solvents water and either aqueous or anhydrous lower aliphatic alcohols are particularly advantageous but moist dialkyl ethers and dioxane-water mixtures may also be used. The alkaline condensation catalysts used in this phase of the invention may be organic bases, inorganic bases or inorganic salts of acidic or pseudo acidic organic compounds. Some representative types of these catalysts are the hydroxides, oxides, carbonates, bicarbonates and amides of alkali or alkaline earth metals; alkali metal alkoxides; alkaline earth alkoxides; alkali metal phenolates; alkali metal salts of lower aliphatic carboxylic acids; organic tertiary amines and quaternary ammonium hydroxides of organic tertiary amines. In general, the weakly alkaline catalysts such as sodium bicarbonate, potassium bicarbonate, calcium hydroxide, pyridine, triethylamine, N-ethyl morpholine, N,N-dimethyl aniline and the like are preferred since they make the reaction much easier to control. When strongly alkaline catalysts such as sodium hydroxide, potassium hydroxide, potassium carbonate, sodium methylate, sodium ethylate and the like are used, care must be taken to remove or inactivate the catalyst as soon as the reaction is completed in order to prevent the conversion of the desired product to the corresponding methylene bis compound by a dehydration and coupling reaction. Although the amount of the catalyst is not critical and can vary from a few hundredths or thousandths of a mol to one mol or more, it is preferable from the standpoint of yields to use only enough to bring about a relatively rapid reaction. In most cases 0.05 mol or less is sufficient.

The temperature used in carrying out this methylolation reaction, as well as the time required for its completion, varies with the catalyst used. In general, the reaction can be carried out at a temperature between about 0 and 75° C. in a time varying from a few minutes to several hours. When strongly alkaline catalysts are used the reaction proceeds very rapidly and is usually complete in a few minutes at room temperature or below. However, when mildly alkaline catalysts are employed the reaction is not so rapid and usually requires from fifteen minutes to several hours at room temperature or slightly above, that is, at about 25 to 50° C.

The reduction of the $\alpha$-acylamino-$\beta$-hydroxypropiophenone compounds or of the corresponding $\beta$-acyloxy derivatives to the amino diol products of the invention, shown by B in the above diagram, can be carried out in several different ways. For example, it may be carried out using hydrogen gas in conjunction with a metal hydrogenation catalyst; an oxidizable aluminum alkoxide or nascent hydrogen generated in the reaction mixture by the interaction of a metal with an acid, lower aliphatic alcohol, water or mixtures of the same.

In carrying out the hydrogenation by catalytic means, hydrogen pressures ranging from about 25 to 4000 lbs. per sq. in. and temperatures below about 100° C. can be used. However, in order to lessen hydrogenolysis of the product it is preferable to keep the temperature and pressure as low as possible. A temperature of about 20 to 45° C. and a pressure of about 40 to 1000 lbs. per sq. in. are usually sufficient to bring about reduction within a reasonable time and hence are preferred. Some examples of the hydrogenation catalysts which can be employed are Raney nickel, palladium, palladium oxide, platinum, platinum oxide and the like while suitable solvents for the reduction include lower aliphatic alcohols and aqueous solutions of the same, lower aliphatic acids, dioxane-water mixtures and the like.

When using the nascent hydrogen method of reduction, metals or alloys such as sodium, potassium, calcium, sodium amalgam, potassium amalgam, iron and the like are caused to react with the solvent used for the reaction to produce hydrogen in the reaction mixture. Some examples of the solvents which can be used are lower aliphatic alcohols such as methanol, ethanol and isopropanol; lower aliphatic acids such as acetic acid; aqueous mixtures of either lower aliphatic alcohols or acids; moist dialkyl ethers such as moist diethyl ether and lower aliphatic alcohol-acid-water mixtures. Specific combinations of these metals and solvents which have been found to be particularly effective in bringing about the reduction of the ketonic compounds are sodium, potassium or calcium and absolute ethanol or methanol; sodium or potassium amalgam in moist ether, ethanol or acetic acid; and iron in dilute ethanol containing acetic acid.

When an oxidizable aluminum alkoxide is used as a reductant for the ketonic compounds of the invention the reaction is carried out at a temperature between about 20 and 125° C. in a lower aliphatic alcohol which is, preferably, the one corresponding to the alkoxide. The use of alkoxides of secondary alcohols such as isopropanol and secondary butyl alcohol is preferred since these alkoxides are more readily oxidized and hence milder reaction conditions can be employed. Regardless of the acylated ketonic compound used as the starting material the product obtained under these reduction conditions consists almost totally of the corresponding 1-phenyl-2-acylamido-propane-1,3-diol compound due to the simultaneous hydrolysis of the terminal acyl group which takes place when a $\beta$-acyloxy-$\alpha$-acylamidopropiophenone is employed as the starting material.

Although all of the foregoing methods of reduction can be used with about equal success in most instances there are, of course, instances where the use of one method is preferable. Similarly, the optimal conditions or reagents used in conjunction with one method vary somewhat in the individual cases. For example, where the ketonic compound to be reduced contains a halogen substituent in the phenyl ring or acyl group(s) it is preferable to use an oxidizable aluminum alkoxide such as aluminum isopropylate as the reductant since the metallic catalysts used in the catalytic method of hydrogenation and some of the metals (such as sodium, potassium and the like) used in the nascent hydrogen method of reduction tend to remove the halogen atom during the reaction.

The conversion of the $\alpha$-acylamino-$\beta$-hydroxypropiophenone compounds to the corresponding $\beta$-acyloxy derivatives, shown by C in the above diagram, can be effected by treating the $\beta$-hydroxy propiophenone compound with an acyl halide or acyl anhydride under substantially anhydrous conditions either alone or in the presence of an acylation catalyst such as an inorganic base, an alkaline salt of an organic acid, an organic tertiary base, an aromatic sulfonic acid or sulfuric acid. The acylation can, in general, be carried out at a temperature varying from about 10° to 140° C. but the preferred temperature for the reaction is between about 60 and 120° C. An inert organic solvent such as benzene, petroleum ether, toluene and the like can be used for the reaction if desired although in most cases it is more expedient to omit the use of a solvent and to merely use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethyl morpholine, N-methyl piperidine, N,N-dimethyl aniline, p-toluene sulfonic acid and sulfuric acid.

The products of the invention are particularly useful as intermediates in the synthesis of organic compounds possessing antibiotic activity. For example, the products produced in Examples 1, 2 or 3 can be converted to (1)-ψ-1-p-nitrophenyl-2 - dichloroacetamidopropane - 1,3 - diol, a compound possessing outstanding and unique antibiotic properties, by the methods described in the copending application of Crooks et al. Serial No. 15,264, filed March 16, 1948, now Patent No. 2,483,884.

The invention is illustrated by the following examples.

*Example 1*

A mixture consisting of 48 g. of ω-benzoylaminoacetophenone, 7.2 g. of paraformaldehyde and 0.2 g. of potassium carbonate in 300 cc. of methanol is allowed to stand at room temperature for eighteen minutes. The reaction mixture is added to one liter of ice water and the gummy solid which separates collected and washed with water. The crude α-benzamido-β-hydroxypropiophenone,

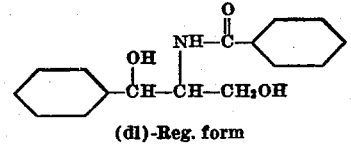

thus obtained is dissolved in 400 cc. of ethanol. 5 g. of Raney nickel is added to the solution and the mixture shaken with gaseous hydrogen under about 50 lbs. per sq. in. pressure for three to four hours at room temperature. The catalyst is removed by filtration and the filtrate heated to boiling and mixed with an equal volume of hot water. After allowing the cool solution containing the desired 1-phenyl-2-benzamidopropane-1,3-diol to stand overnight at 0° C., the crystals which have separated from the solution are collected. This crystalline product is the pseudo or trans structural form of the desired benzamido diol, (dl)-ψ-1-phenyl-2-benzamido-propane -1,3- diol. The formula of this product which melts at 166–7° C. after recrystallization from ethanol is,

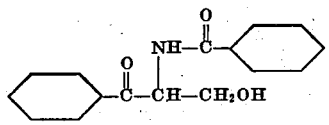

(dl)-ψ Form

The filtrate from the separation of the (dl)-pseudo form of the product is evaporated to dryness in vacuo and the crude regular or cis structural form of the benzamido diol purified by recrystallization from methanol. Its formula is,

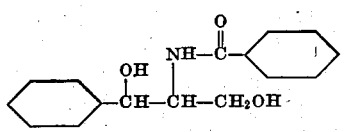

(dl)-Reg. form

*Example 2*

(a) A mixture consisting of 6 g. of ω-benzoylaminoacetophenone, 0.2 g. of sodium bicarbonate and 1.5 g. of paraformaldehyde in 50 cc. of methanol is warmed at 45 to 50° C. for one-half hour to obtain a clear solution. The reaction mixture is allowed to stand for one hour and then poured into 300–400 cc. of ice water. The precipitated product is collected, washed with water and purified by recrystallization from ethanol to obtain the pure α-benzamido-β-hydroxypropiophenone melting at 137–41° C.

(b) A mixture consisting of 6 g. of ω-benzoylaminoacetophenone, 0.1 g. of sodium and 1.5 g. of paraformaldehyde in 50 cc. of methanol is allowed to stand at room temperature until the solution becomes clear, about five minutes. The reaction mixture is immediately poured into 300 cc. of ice water and the desired α-benzamido-β-hydroxypropiophenone isolated and purified as described in (a).

(c) A mixture consisting of 6 g. of ω-benzoylaminoacetophenone, 0.2 g. of potassium carbonate and 3 g. of paraformaldehyde in a solvent mixture composed of 30 cc. of methanol and 10 cc. of water is stirred at room temperature for about ten minutes. The reaction mixture is poured into about 300 cc. of ice water and the crude α - benzamido-β-hydroxy - propiophenone isolated and purified as described in (a).

(d) A mixture consisting of 6 g. of ω-benzoylaminoacetophenone, 0.2 g. of potassium carbonate and 3.75 g. of paraformaldehyde in 35 cc. of methanol is stirred at about 25° C. for five minutes, poured into 400 cc. of ice water and the crude α-benzamido-β-hydroxypropiophenone isolated and purified by recrystallization as described in (a).

(e) 25 g. of α-benzamido-β-hydroxypropiophenone, prepared by any of the above methods, is dissolved in 300 cc. of methanol and 0.5 g. of palladium oxide hydrogenation catalyst added to the solution. The mixture is shaken with gaseous hydrogen under a pressure of about 50 lbs. per sq. in. at room temperature until the theoretical amount of hydrogen has been taken up. The catalyst is removed by filtration and the methanol filtrate concentrated to a volume of about 200 cc. An equal volume of hot water is added to the solution and the (dl)-ψ-1-phenyl-2-benzamidopropane-1,3-diol which separates on cooling is collected and purified by recrystallization from methanol.

The filtrate from the isolation of the (dl)-pseudo structural isomer is evaporated to dryness and the crude (dl)-reg.-1-phenyl-2-benzamidopropane-1,3-diol thus obtained purified by recrystallization from methanol.

If the mixture of the two structural forms of the 1-phenyl-2-benzamidopropane-1,3-diol is desired it can be obtained by evaporation of the methanol reaction mixture after removal of the catalyst.

(f) A mixture consisting of 4 g. of α-benzamido-β-hydroxypropiophenone and 200 cc. of 5% hydrochloric acid is heated under reflux for about three to four hours and then evaporated to dryness in vacuo. The residue is taken up in a small amount of water, the solution made alkaline and extracted with ethyl acetate. The ethyl acetate extracts are dried and then the ethyl acetate removed by distillation in vacuo to obtain the desired α-amino-β-hydroxypropiophenone.

(g) 8 g. of α-benzamido-β-hydroxypropiophenone is heated at about 75° C. for one-half hour with 20 cc. of acetic anhydride containing a small amount of concentrated sulfuric acid and then the reaction mixture evaporated to dryness in vacuo. The residual crude α-benzamido-β-acetoxypropiophenone is washed with ice water and purified by recrystallization from methanol or ethanol. Its formula is:

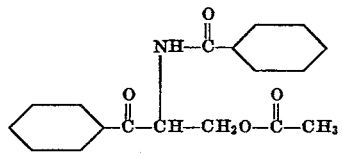

(h) A mixture consisting of 10 g. of α-benzamido-β-acetoxypropiophenone, 0.3 g. of Raney nickel hydrogenation catalyst and 150 cc. of methanol is shaken at 30° C. with gaseous hydrogen under a pressure of about 60 lbs. per sq. in. until the theoretical amount of hydrogen has been absorbed. The reaction mixture is concentrated to a volume of about 80 cc. in vacuo, cooled and the catalyst and insoluble organic material removed by filtration. The solid is extracted with boiling alcohol, the extracts cooled and the crude (dl)-ψ-1-phenyl-2-benzamido-3-acetoxypropane-1-ol collected. This product which has the formula,

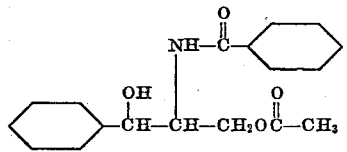

(dl)-ψ Form can be purified further if desired by recrystallization from alcohol.

The corresponding (dl)-reg. isomer can be obtained from the filtrate of the reaction mixture by evaporation of the methanol. The pure isomer is obtained by recrystallization of the crude material from alcohol-water mixtures.

*Example 3*

0.2 g. of sodium bicarbonate is added to a solution of 17.7 g. of ω-acetylaminoacetophenone and 6 g. of paraformaldehyde in 300 cc. of methanol and the resulting mixture heated at 45 to 50° C. for about one-half hour. The reaction mixture is poured into 800 cc. of ice water and the crude α-acetamido-β-hydroxypropiophenone which separates collected and washed with water. If desired, this product can be purified by recrystallization from methanol. Its formula is,

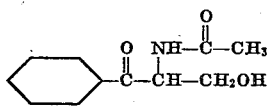

3 g. of Raney nickel hydrogenation catalyst is added to a solution of 15 g. of α-acetamido-β-hydroxypropiophenone in 200 cc. of ethanol and the mixture shaken with gaseous hydrogen under a pressure of about 60 lbs. per sq. in. at 30° C. until one mol of hydrogen has been absorbed. The catalyst is removed by filtration, the filtrate containing the desired 1-phenyl-2-acetamidopropane-1,3-diol heated to boiling and treated with slightly more than an equal volume of hot water. After standing at 0° C. for about twenty-four hours, the crystalline (dl)-ψ-1-phenyl-2-acetamidopropane-1,3-diol is collected and purified by recrystallization from methanol; M. P. 132–3° C. This product has the formula,

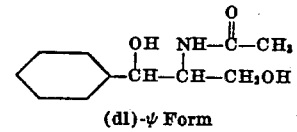

(dl)-ψ Form

The filtrate from the separation of the (dl)-pseudo isomer is evaporated to dryness in vacuo and the residue which consists principally of the (dl)-regular isomer purified by fractional crystallization from ethanol or ethanol-water mixtures to obtain the pure (dl)-reg.-1-phenyl-2-acetamidopropane-1,3-diol. The formula of this product is the same as that of the (dl)-pseudo isomer except that this compound has a cis structural configuration.

A mixture consisting of 5 g. of α-acetamido-β-hydroxy-propiophenone and 10 cc. of acetic anhydride is warmed to 40° C. and one drop of concentrated sulfuric acid added to the solution. The mixture is allowed to stand for one-half hour and then is evaporated to dryness in vacuo. The residue which consists of α-acetamido-β-acetoxypropiophenone of formula,

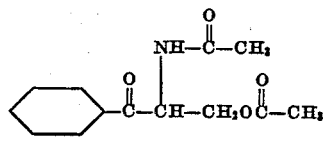

is washed with water and purified by recrystallization from ethanol.

α-Acetamido-β-acetoxypropiophenone can also be obtained by heating 5 g. of α-acetamido-β-hydroxypropiophenone at about 70° C. for one-half hour with a mixture consisting of 5 cc. of acetic anhydride and 5 cc. of dry pyridine, evaporating the reaction mixture to dryness, washing the residue with water and purifying the product by recrystallization from alcohol.

10 g. of α-acetamido-β-hydroxypropiophenone in 100 cc. of 18% hydrochloric acid is heated on a steam bath for forty-five minutes. The reaction mixture is cooled, extracted with ethyl acetate and concentrated to dryness in vacuo. The solid residue which consists of α-amino-β-hydroxypropiophenone hydrochloride is ground under absolute ethanol, collected and washed with a small amount of absolute ethanol. This product which has the formula,

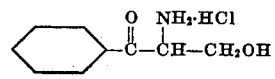

can be purified by recrystallization from hot absolute ethanol.

A mixture consisting of 20 g. of α-acetamido-β-acetoxypropiophenone, 0.5 g. of Raney nickel hydrogenation catalyst and 200 cc. of ethanol is shaken at 25° C. with gaseous hydrogen under a pressure of about 50 lbs. per sq. in. until one mol of hydrogen has been absorbed. The reaction mixture is chilled and the solid removed by filtration. The solid which consists of a mixture of (dl)-ψ-1-phenyl-2-acetamido-3-acetoxypropane-1-ol and the hydrogenation catalyst is extracted with boiling ethanol, the extracts cooled and the (dl)-ψ-1-phenyl-2-acetamido-3-acetoxypropane-1-ol which separates collected. This compound which has the formula,

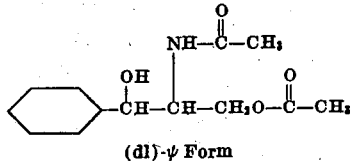

(dl)-ψ Form melts at 167–8° C. when pure.

Example 4

A mixture consisting of 25.3 g. of ω-benzoylamino-2-methylacetophenone, 6 g. of paraformaldehyde and 0.3 g. of pyridine in 300 cc. of ethanol is warmed at 35° C. for one-half hour and then poured into 800 cc. of ice water. The crude α-benzamido-β-hydroxy-2-methylpropiophenone is collected, washed with water and purified by recrystallization from methanol. The formula of this product is:

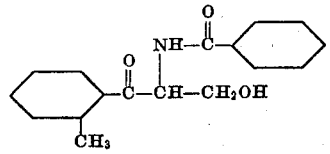

5 g. of α-benzamido-β-hydroxy-2-methylpropiophenone in 150 cc. of 10% hydrobromic acid is heated under reflux for about two hours. The reaction mixture is concentrated to a volume of about 75 cc. in vacuo, cooled and the benzoic acid which precipitates removed by filtration. The filtrate is evaporated to dryness in vacuo to obtain the hydrobromide salt of α-amino-β-hydroxy-2-methylpropiophenone. Recrystallization from absolute ethanol yields the pure compound. This product has the formula,

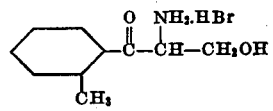

0.5 g. of palladium oxide hydrogenation catalyst is added to a solution of 20 g. of α-benzamido-β-hydroxy-2-methylpropiophenone in 300 cc. of ethanol and the mixture shaken at room temperature with gaseous hydrogen under a pressure of about 50 lbs. per sq. in. until one mol of hydrogen has been absorbed. The catalyst is removed by filtration, the filtrate containing the desired 1-(2'-methylphenyl)-2 - benzamidopropane - 1,3 - diol concentrated to a volume of about 150 cc. and an equal volume of hot water added to the hot solution. After allowing the solution to stand at 0° C. for about twenty-four hours, the crystalline (dl)-ψ-1-(2'-methylphenyl) - 2 - benzamidopropane-1,3-diol is collected and purified by recrystallization from methanol. Its formula is,

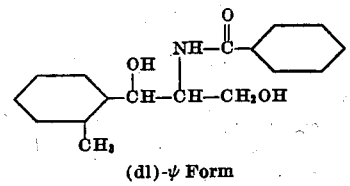

(dl)-ψ Form

The filtrate from which the (dl)-pseudo isomer has been separated is evaporated to dryness and the residue taken up and fractionally crystallized from methanol to obtain the desired (dl)-reg.-1-(2'-methylphenyl)-2 - benzamidopropane - 1,3-diol of formula,

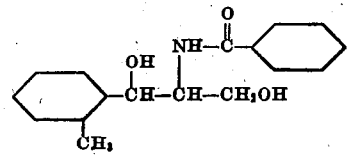

(dl)-Reg. form

A mixture consisting of 5 g. of α-benzamido-β-hydroxy-2-methylpropiophenone, 20 cc. of dry pyridine and 20 cc. of benzoyl chloride is allowed to stand at 25° C. for about twenty-four hours, poured into 300 cc. of ice water and the crude α-benzamido-β-benzoxy - 2 - methylpropiophenone collected. This product which has the formula,

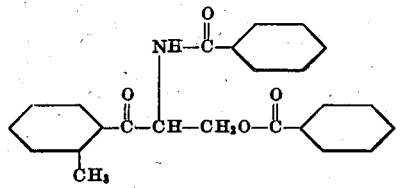

is purified by washing with water and recrystallization from alcohol.

5 g. of α-benzamido-β-benzoxy-2-methyl propiophenone and 0.5 g. of palladium oxide in 100 cc. of ethanol are shaken at room temperature with gaseous hydrogen under a pressure of about 65 lbs. per sq. in. until one mol of hydrogen is absorbed. The reaction mixture is warmed to about 60° C., the catalyst removed by filtration and the filtrate evaporated to dryness in vacuo to obtain the desired 1-(2'-methylphenyl)-2-benzamido-3-benzoxypropane-1-ol of formula,

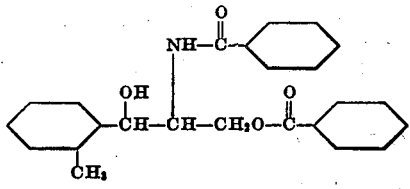

Example 5

A mixture consisting of 28.5 g. of ω-(p-methylbenzoylamino)-3-methoxyacetophenone, 7 g. of paraformaldehyde and 0.3 g. of calcium hydroxide in 300 cc. of ethanol containing about 25 cc. of water is heated at 35° C. for about twenty to twenty-five minutes. The reaction mixture is poured into one liter of ice water and the α-(p-methylbenzamido) - β - hydroxy-3-methoxypropiophenone which separates collected. The crude product is washed with water and then purified by recrystallization from ethanol or methanol. Its formula is:

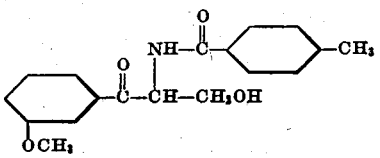

5 g. of α-(p-methylbenzamido)-β-hydroxy-3-methoxypropiophenone is heated under reflux for three hours with 150 cc. of 10% hydrochloric acid. The reaction mixture is cooled, exhaustively extracted with ether to remove the p-methyl benzoic acid and the aqueous phase evaporated to dryness in vacuo. The crystalline residue obtained upon evaporation of the aqueous phase is m-methoxy-α-amino-β-hydroxypropiophenone hydrochloride of formula

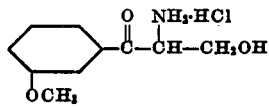

This white crystalline salt may be purified by recrystallization from hot absolute ethanol.

15 g. of α-(p-methylbenzamido)-β-hydroxy-3-methoxypropiophenone is dissolved in 200 cc. of ethanol containing a small amount of water. 4 g. of fine sodium wire is added slowly to the solution keeping the temperature at about 20° C. After all the sodium has dissolved, the reaction mixture is poured into one liter of ice water and acidified with dilute hydrochloric acid in the cold. The solution is exhaustively extracted with ethyl acetate, the combined extracts dried and the ethyl acetate is removed by distillation in vacuo to obtain the desired 1-(3'-methoxyphenyl) - 2 - (p - methylbenzamido)-propane-1,3-diol of formula,

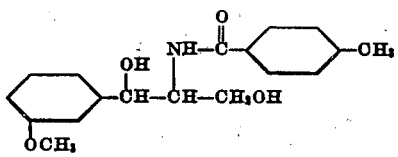

If desired, the product can be separated into its two structural isomeric forms, that is, the (dl)-regular and the (dl)-pseudo forms, by fractional crystallization from methanol- or ethanol-water mixtures.

Example 6

A mixture consisting of 22.3 g. of ω-propionylamino-3,4-dimethylacetophenone, 7 g. of paraformaldehyde and 0.2 g. of sodium carbonate in 300 cc. of ethanol is stirred at room temperature, about 25° C., for about one-half hour and then poured into one liter of ice water. The α-propionamido - β - hydroxy - 3,4 - dimethylpropiophenone which precipitates is collected, washed with water and purified by recrystallization from methanol. Its formula is:

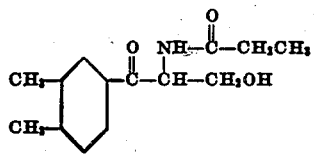

5 g. of α-propionamido - β - hydroxy-3,4-dimethylpropiophenone is heated under reflux with 150 cc. of 10% hydrochloric acid for about three hours. The reaction mixture is cooled, extracted with ethyl acetate and the aqueous phase evaporated to dryness in vacuo. The white crystalline compound thus obtained is the hydrochloride salt of 4,5-dimethyl-α-amino-β-hydroxypropiophenone. This salt has the formula,

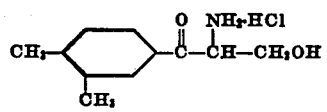

2 g. of Raney nickel hydrogenation catalyst is added to a solution of 20 g. of α-proprionamido-β-hydroxy-3,4-dimethylpropiophenone in 300 cc. of ethanol and the mixture shaken under about 60 lbs. per sq. in. pressure of hydrogen gas for several hours. As soon as the hydrogen uptake reaches the theoretical amount the reaction is stopped and the catalyst removed by filtration. The filtrate containing the desired 1-(3',4'-dimethylphenyl) - 2 - propionamidopropane-1,3-diol is evaporated to dryness in vacuo and the crude product separated into its structural isomeric forms by fractional crystallization from methanol or methanol-water mixtures. The higher melting trans or pseudo isomer, that is, (dl - ψ - 1-(3',-4'-dimethylphenyl)-2-propionamidopropane-1,3-diol, separates from the crystallization mixture first. Its formula is:

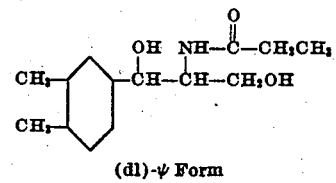

(dl)-ψ Form

The (dl)-regular isomer which has the formula,

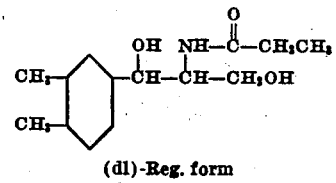

(dl)-Reg. form is recovered from the filtrates.

A mixture consisting of 5 g. of α-propionamido-β-hydroxy-3,4-dimethylpropiophenone, 10 g. of benzoic anhydride, 0.1 cc. of concentrated sulfuric acid and 50 cc. of benzene is heated at 50° C. for one-half hour. The benzene is removed by distillation in vacuo and the residue treated with 200 cc. of ice water. The mixture is made alkaline with sodium hydroxide solution and the insoluble product which consists of crude α-propionamido-β-benzoxy-3,4-dimethylpropiophenone of formula,

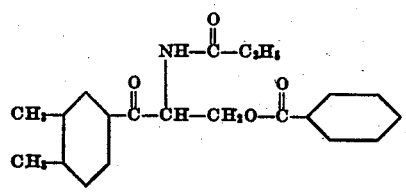

collected.

0.5 g. of Raney nickel hydrogenation catalyst is added to a solution of 5 g. of α-propionamido-β-benzoxy-3,4-dimethylpropiophenone in 150 cc. ethanol and the resulting mixture shaken at 30° C. with gaseous hydrogen under a pressure of about 50 lbs. per sq. in. After one mol of hydrogen has been absorbed, the reaction is stopped, the mixture heated to boiling and filtered. Evaporation of the filtrate yields a mixture of the structural forms of 1-(3',4'-dimethylphenyl)-2-propionamido-3-benzoxypropane-1-ol. This compound has the formula,

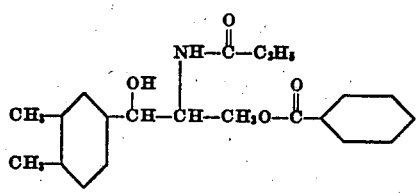

Example 7

A mixture consisting of 25 g. of ω-phenylacetamido-4-chloroacetophenone, 0.2 g. of sodium bicarbonate and 5 g. of paraformaldehyde in 300 cc. of methanol is heated at 40° C. for about twenty minutes with stirring and then poured into one liter of ice water. The crude α-phenylacetamido-β-hydroxy-4-chloropropiophenone which separates is collected, washed with water and purified by recrystallization from alcohol. Its formula is:

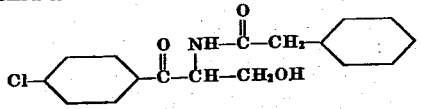

5 g. of α-phenylacetamido-β-hydroxy-4-chloropropiophenone is heated under reflux with 100 cc. of 15% hydrobromic acid for three hours. The reaction mixture is cooled, extracted with ether and the aqueous phase evaporated to dryness in vacuo. The white crystalline residue consists of the desired hydrobromide salt of α-amino-β-hydroxy-4-chloropropiophenone. This compound which can be purified by recrystallization from absolute ethanol has the formula,

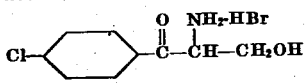

A mixture consisting of 15.8 g. of α-phenylacetamido-β-hydroxy-4-chloropropiophenone, 10 g. of aluminum isopropylate and 100 cc. of dry isopropanol is heated under reflux while distilling off a small portion of the isopropanol from the reaction mixture. Refluxing is continued until the distillate gives a negative test for acetone and then the isopropanol distilled off under vacuo. The residue is cooled, treated with ice cold dilute hydrochloric acid and extracted with ethyl acetate. The ethyl acetate extracts are dried and the ethyl acetate distilled to obtain the desired 1-p-chlorophenyl-2-phenylacetamidopropane-1,3-diol. This product has the formula,

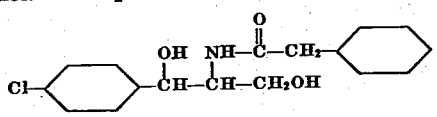

A mixture consisting of 10 g. of α-phenylacetmido-β-hydroxy-4-chloropropiophenone and 20 cc. of acetic anhydride is heated at 100° C. for about one hour and then the acetic acid and excess acetic anhydride removed by distillation in vacuo. The residue is treated with ice water and purified by recrystallization from ethanol. This product is α-phenylacetamido-β-acetoxy-4-chloropropiophenone which has the formula,

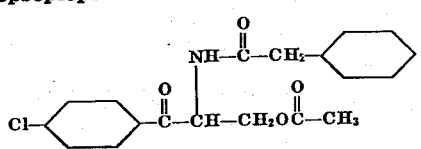

Example 8

A mixture consisting of 25 g. of p-iodo-ω-dichloroacetamidoacetophenone, 150 cc. of methanol, 50 cc. of 38% aqueous formaldehyde and 0.5 g. of sodium bicarbonate is heated at 35° C. for one and one-half hours. The reaction mixture is cooled, the solid product collected and washed with water. The crude p-iodo-α-dichloroacetamido-β-hydroxypropiophenone thus obtained is purified by recrystallization from ethanol or methanol. The formula of this product is,

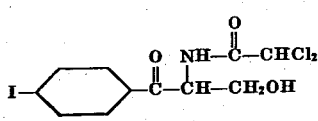

5 g. of p-iodo-α-dichloroacetamido-β-hydroxypropiophenone is heated under reflux for two hours with 100 cc. of 18% hydrochloric acid. The reaction mixture is cooled, extracted exhaustively with ethyl acetate and the aqueous phase evaporated to dryness in vacuo. The product thus obtained is the hydrochloride salt of p-iodo-α-amino-β-hydroxypropiophenone. This salt can be purified by recrystallization from asolute ethanol. Its formula is,

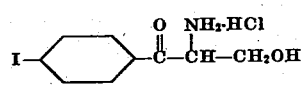

A mixture consisting of 7 g. of p-iodo-α-dichloroacetamido-β-hydroxypropiophenone, 6 g. of succinic anhydride and 2 drops of concentrated sulfuric acid is heated at 60° C. for about one hour. 150 cc. of cold water is added to the reaction mixture and the insoluble product collected. The insoluble product is suspended in 100 cc. of cold water and the solution made alkaline to pH 10 by the addition of 10 N sodium hydroxide solution. The solution is extracted with ethyl acetate, the aqueous phase decolorized with charcoal and the clarified solution acidified with dilute hydrochloric acid. The insoluble product which consists of p-iodo-α-dichloroacetamide-β-(β'-carboxypropionyloxy)-propiophenone is collected, washed with water and purified by recrystallization from ethanol. The formula of this white crystalline product is,

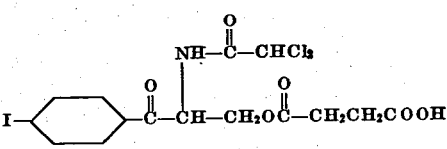

18 g. of p-iodo-α-dichloroacetamido-β-hydroxypropiophenone is added to 10 g. of aluminum isopropylate in 250 cc. of dry isopropanol and the mixture refluxed for six hours. During the heating period a stream of nitrogen is passed through the solution and a small amount of the reaction mixture is continuously distilled off. The isopropanol is removed by distillation in vacuo, the residue treated with 250 cc. of water and the mixture heated to boiling. The aluminum hydroxide is removed by filtration and the filtrate evaporated to dryness in vacuo. The residue is washed with several small portions of ethyl acetate and the crystalline solid containing (dl)-ψ-1-p-iodophenyl-2-dichloroacetamido-propane-1,3-diol which fails to dissolve collected and recrystallized from water to obtain the desired (dl)-ψ isomer. This product which has the formula,

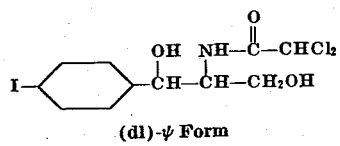

(dl)-ψ Form can be purified by recrystallization from ethylene dichloride.

Example 9

11 g. of ω-fluoroacetamidoacetophenone is mixed with 50 cc. of methanol and 17 cc. of 38% aqueous formaldehyde. 0.4 g. of sodium bicarbonate is added and the mixture stirred at 35° C. for about one hour during which time the solid product separates. The mixture is cooled, stirred for about one-half hour and the solid product collected. The product thus obtained is α-fluoroacetamido-β-hydroxypropiophenone of formula,

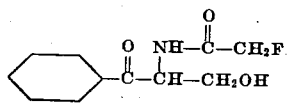

The product is washed with water and purified, if desired, by recrystallization from alcohol.

7.5 g. of α-fluoroacetamido-β-hydroxypropiophenone is mixed with 4.5 g. of aluminum isopropylate and 75 cc. of dry isopropanol. The mixture is heated under reflux for five hours during which time the acetone formed is distilled off and a stream of nitrogen is passed through the solution. The isopropanol is removed by distillation in vacuo and the residue treated with about 200 cc. of water. The mixture is warmed to insure complete precipitation of the aluminum hydroxide, the aluminum hydroxide removed by filtration and the filtrate evaporated to dryness in vacuo. The residue is washed with several portions of hot ethyl acetate and the material which fails to dissolve collected. The product thus obtained is composed principally of (dl)-ψ-1-phenyl-2-fluoroacetamidopropane-1,3-diol. This product has the formula,

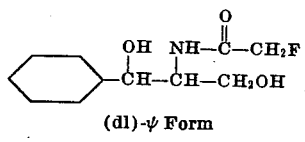

(dl)-ψ Form 7 g. of α-fluoroacetamido-β-hydroxypropiophenone is heated with 10 g. of phenylacetic anhydride and 0.1 cc. of concentrated sulfuric acid with stirring at 60° C. for one hour. The reaction mixture is treated with 200 cc. of cold water, made alkaline to pH 10 with 10 N sodium hydroxide solution and allowed to stand for one hour. The insoluble product is collected, washed well with water and purified by recrystallization from ethanol. The product thus obtained is α-acetamido-β-phenacetoxypropiophenone of formula,

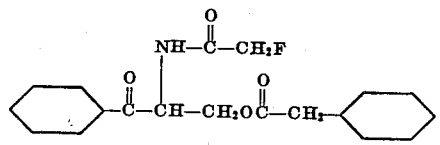

*Example 10*

A mixture consisting of 15 g. of 3-chloro-ω-(α-chloropropionamido)-acetophenone, 6 g. of paraformaldehyde and 0.2 g. of sodium carbonate in 200 cc. of 70% aqueous methanol is stirred at room temperature for about one hour. The reaction mixture is poured into 500 cc. of ice water and the precipitated product collected. The product is washed with water and purified by recrystallization from methanol or ethanol to obtain the desired 3-chloro-α-(α'-chloropropionamido)-β-hydroxypropiophenone of formula,

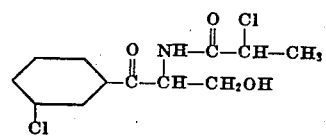

8 g. of 3-chloro-α-(α'-chloropropionamido-β-hydroxy-propriophenone is added to 6 g. of aluminum isopropylate in 250 cc. of dry isopropanol. The mixture is heated at 50° C. for about twenty-four hours during which time a stream of nitrogen is passed through the solution. The isopropanol is removed by distillation in vacuo and the residue treated with about 200 cc. of water. The mixture is warmed to insure complete precipitation of the aluminum hydroxide, the aluminum hydroxide removed by filtration and the filtrate evaporated to dryness in vacuo. The residue is washed with several portions of hot ethyl acetate and the material which fails to dissolve collected. Recrystallization from water yields the desired (dl)-ψ-1-(3-chlorophenyl)-2-α-chloropropionamidopropane-1,3-diol of formula,

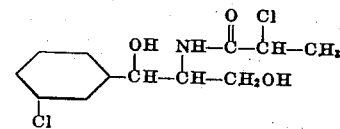

(dl)-ψ Form 7 g. of 3-chloro-α-(α'-chloropropionamido)-β-hydroxy-propiophenone is mixed with 8 g. of dry pyridine and the mixture cooled to 0° C. 5 g. of chloroacetyl chloride is added dropwise with stirring, keeping the temperature at about 0° C. After the addition has been completed the mixture is stirred for one-half hour and then treated with 150 cc. of ice water. The insoluble product is collected, washed well with water and purified by recrystallization from ethanol or methanol. The white crystalline compound thus obtained is 3-chloro-α-(α'-chloropropionamido)-β-chloroacetoxypropiophenone. This compound has the formula,

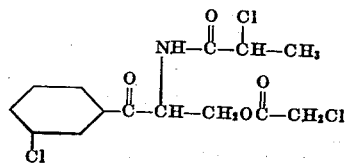

*Example 11*

12 g. of ω-methoxyacetamidoacetophenone is mixed with 50 cc. of methanol and 17 cc. of 38% aqueous formaldehyde. 0.3 g. of sodium bicarbonate is added and the mixture stirred at 40° C. for about one and a half hours. The solid which precipitates during this period is collected from the cooled solution, washed with water and dried. The product thus obtained is α-methoxyacetamido-β-hydroxypropiophenone of formula,

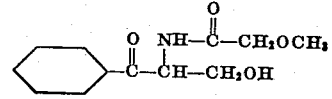

A mixture consisting of 15 g. of α-methoxyacetamido-β-hydroxypropiophenone, 2 g. of Raney nickel hydrogenation catalyst and 250 cc. of ethanol is shaken under 60 lbs./sq. in. pressure of hydrogen gas for several hours. As soon as the hydrogen uptake reaches the theoretical amount the reaction is stopped and the catalyst removed by filtration. The filtrate containing the desired 1-phenyl-2-methoxyacetamidopropane-1,3-diol is evaporated to dryness in vacuo and the crude product separated into its structural isomeric forms by fractional crystallization from methanol or methanol-water mixtures. The first isomer to separate from the solution is the (dl)-ψ form which has the formula,

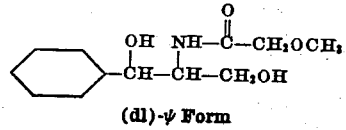

(dl)-ψ Form 7 g. of α-methoxyacetamido-β-hydroxypropiophenone is added to 7 g. of dry pyridine and the mixture cooled to 0° C. 4 g. of methoxyacetyl chloride is added dropwise with stirring, keeping the temperature at about 0° C. After the addition has been completed the mixture is stirred for a short time and then poured into about 150 cc of ice water. The insoluble product is collected, washed well with water and purified by recrystallization from methanol. The white crystalline compound thus obtained is α-methoxyacetamido-β-methoxyacetoxypropiophenone having the formula,

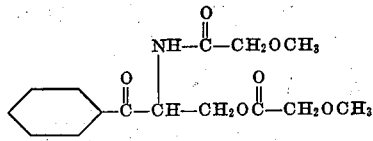

Reduction of α-methoxyacetamido-β-methoxyacetoxypropiophenone with hydrogen using a Raney nickel catalyst results in the production of a mixture of the structural forms of 1-phenyl-2-methoxyacetamido-3-methoxyacetoxypropane-1-ol of formula,

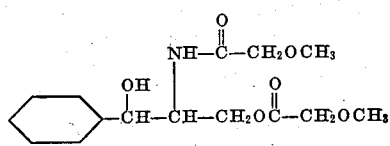

*Example 12*

2 g. of sodium bicarbonate and 26 cc. of 38% aqueous formaldehyde are added to a solution consisting of 51.2 g. of p-bromo-ω-acetamido-acetophenone and 150 cc. of 95% ethanol. The mixture is stirred at 40-41° C. for one and a half hours, cooled to 5° C. and stirred for an additional hour. The white crystalline p-bromo-α-acetamido-β-hydroxypropiophenone is collected, washed with water and dried at 60° C.; M. P. 146-8° C. This compound has the formula,

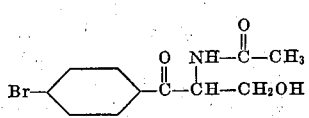

A mixture consisting of 57.5 g. of p-bromo-α-acetamido-β-hydroxypropiophenone, 86 g. of aluminum isopropylate and 500 cc. of anhydrous isopropanol is heated under reflux for about six hours. During this time a small amount of the reaction mixture is distilled off and tested from time to time for acetone. A solution consisting of 45 cc. of water and 100 cc. of isopropanol is added to the reaction mixture along with 50 g. of aluminum silicate filter aid. The reaction mixture is heated for fifteen minutes and filtered while hot. The residue is washed well with isopropanol and the washings together with the filtrate treated with a small amount of water. Upon cooling the crystalline (dl)-ψ-1-p-bromophenyl-2-acetamido-propane-1,3-diol separates. The product is collected by filtration and purified, if desired, by recrystallization from water; M. P. 176-8° C. The formula of this product is,

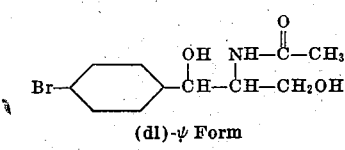

(dl)-ψ Form

A mixture consisting of 2.86 g. of p-bromo-acetamido-β-hydroxypropiophenone, 5 cc. of acetic anhydride and 1 drop of concentrated sulfuric acid is heated with occasional stirring at 80° C. for twenty minutes. The clear yellow solution is cooled and 8 cc. of ethyl acetate added to the pasty reaction mixture. The mixture is warmed to effect solution and then allowed to cool. The crystalline p-bromo-α-acetamido-β-acetoxypropiophenone which separates is collected, washed with ethyl acetate and purified by recrystallization from ethyl acetate; M. P. 128-30° C. The formula of this compound is,

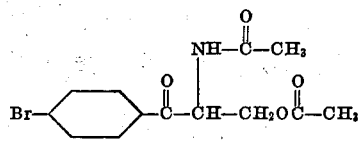

*Example 13*

A mixture consisting of 100 g. of p-chloro-ω-acetamido-acetophenone, 165 cc. of methanol, 5 g. of sodium bicarbonate and 43 cc. of 38% aqueous formaldehyde is heated at 43-45° C. for about one and a half hours. The solution is cooled and allowed to stand overnight. The crystalline p-chloro-α-acetamido-β-hydroxypropiophenone is collected, washed with water and dried at 60° C.; M. P. 125-6° C. The formula of this product is,

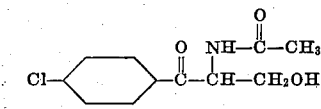

A mixture consisting of 2.4 g. of p-chloro-α-acetamido-β-hydroxypropiophenone and 5 cc. of acetic anhydride containing a few drops of concentrated sulfuric acid is heated at 70° C. for about fifteen minutes. The reaction mixture is cooled, poured into about ten volumes of water and the p-chloro-α-acetamido-β-acetoxypropiophenone which separates in crystalline form collected. Recrystallization from dilute acetic acid yields the pure product which melts at 110-12.5° C. This compound has the formula,

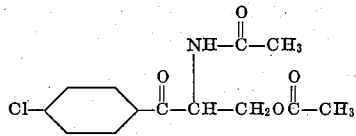

A mixture consisting of 60 g. of p-chloro-α-acetamido-β-hydroxypropiophenone, 108 g. of aluminum isopropylate and 640 cc. of dry isopropanol is heated under reflux for about six hours. During this time a small amount of the reaction mixture is continuously removed by distillation and tested for acetone. 60 cc. of water is added to the reaction mixture, the mixture heated to boiling, cooled and filtered. The aluminum hydroxide precipitate is washed with aqueous isopropanol until the extracts are colorless. Concentration of the combined filtrate and extracts yields the desired crystalline (dl)-ψ-1-p-chlorophenyl-2-acetamidopropane-1,3-diol. This product can be purified by recrystallization from methylethyl ketone or from water; M. P. 166-8° C. The formula of this compound is,

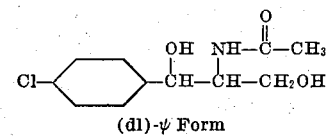

(dl)-ψ Form

Example 14

A mixture consisting of 7 g. of ω-m-chlorobenzamidoacetophenone, 0.2 g. of sodium bicarbonate and 1.5 g. of paraformaldehyde in 50 cc. of methanol is heated at 42° C. for one hour. The reaction mixture is allowed to stand for an hour and is then poured into about 400 cc. of ice water. The precipitated product is collected, washed with water and purified by recrystallization from ethanol to obtain the pure α-m-chlorobenzamido-β-hydroxypropiophenone of formula,

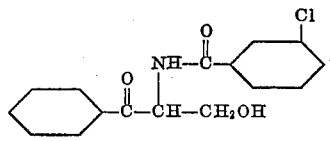

A mixture consisting of 5 g. of α-m-chlorobenzamido-β-hydroxypropiophenone and 5 g. of m-chlorobenzoic acid anhydride and sufficient anhydrous pyridine to effect solution is treated with 2 drops of concentrated sulfuric acid. The resulting mixture is heated at 70° C. for about fifteen minutes, cooled and poured into a large volume of ice water. The insoluble α-m-chlorobenzamido - β - m - chlorobenzoyloxypropiophenone is collected and purified by recrystallization from ethanol. The formula of this product is,

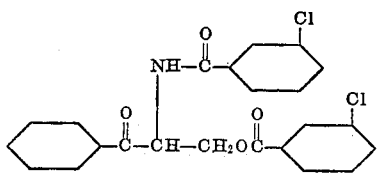

Example 15

65 g. of p-iodo-ω-acetamidoacetophenone is added to 400 cc. of methanol and 2 g. of sodium bicarbonate. 85 cc. of 38% aqueous formaldehyde is added and the mixture heated at 40° C. for one hour. The reaction mixture is cooled, allowed to stand for about an hour and the precipitated p-iodo -α- acetamido-β-hydroxypropiophenone collected and washed with water. This product which has the formula,

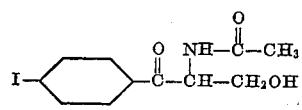

can be purified, if desired, by recrystallization from ethyl acetate; M. P. 158–9° C.

150 g. of p-iodo-α-acetamido-β-hydroxypropiophenone in 1500 cc. of dry isopropanol is heated under reflux with 175 g. of aluminum isopropylate for about six hours. During this time the acetone which is formed is slowly distilled off of the reaction mixture. The reaction mixture is cooled, decomposed with water and the mixture heated to boiling. The hot solution is filtered and the filtrate cooled. The crystalline (dl)-ψ-1-p-iodophenyl-2-acetamidopropane-1,3-diol which separates from the filtrate is collected, washed with water and purified by recrystallization from 20% methanol; M. P. 180–2° C. The formula of this compound is,

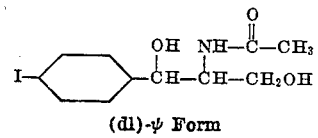

(dl)-ψ Form 5 g. of p-iodo-α-acetamido-β-hydroxypropiophenone is heated on a steam bath for one hour with 100 cc. of 18% hydrochloric acid. The solution is concentrated to dryness in vacuo after extraction with ethyl acetate. The solid residue which consists of p-iodo-α-amino-β-hydroxypropiophenone hydrochloride is washed with a small amount of absolute ethanol and purified by recrystallization from hot absolute ethanol. The formula of this compound is,

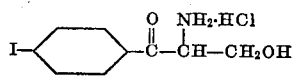

Example 16

24.6 g. of 2,4-dichloro-ω-acetamidoacetophenone is dissolved in 150 cc. of methanol. 0.5 g. of sodium bicarbonate and 10 cc. of 38% aqueous formaldehyde are added to the solution and the mixture warmed until solution is complete. The reaction mixture is cooled, stirred for about an hour and the crystalline 2,4-dichloro-α-acetamido - β - hydroxypropiophenone collected, washed with water and dried at 60° C. This white crystalline compound which has the formula, can be purified, if desired, by recrystallization from ethanol.

A mixture consisting of 3 g. of 2,4-dichloro-α-acetamido-β-hydroxypropiophenone, 6 cc. of acetic anhydride and 2 drops of concentrated sulfuric acid is heated with occasional stirring at 75° C. for about twenty minutes. The clear solution is cooled and ethyl acetate added to the reaction mixture. The mixture is warmed to complete solution and then allowed to cool. The white crystalline 2,4-dichloro -α- acetamido -β- acetoxypropiophenone which separates is collected, washed with ethyl acetate and purified by recrystallization from this solvent. The formula of this compound is,

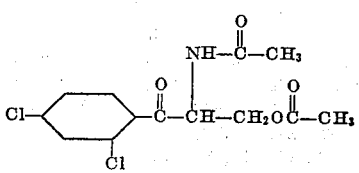

A mixture consisting of 20 g. of 2,4-dichloro-α-acetamido-β-hydroxypropiophenone, 28 g. of aluminum isopropylate and 200 cc. of anhydrous isopropanol is heated under reflux for about six hours. During this time a small amount of the reaction mixture is distilled off and tested for acetone. The solution is also blanketed with nitrogen during the refluxing period. The reaction mixture is treated with 25 cc. of water and a small amount of isopropanol, heated to boiling and then filtered. The filtrate is diluted with a small amount of water and cooled. The crystalline (dl)-ψ-1-(2',4'-dichlorophenyl)-2-acetamidopropane-1,3-diol which separates is collected, washed with water and purified, if desired, by recrystallization from this solvent. The formula of this product is,

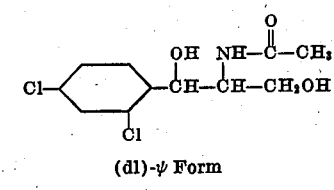

(dl)-ψ Form

Example 17

0.7 g. of sodium bicarbonate and 10 cc. of 38% aqueous formaldehyde are added to a solution consisting of 22 g. of 2-methyl-4-methoxy-ω-acetamidoacetophenone in a mixture consisting of 50 cc. of methanol and 100 cc. of water. The reaction mixture is allowed to warm spontaneously and a small amount of heat from a steam bath applied, if necessary, to effect solution. The reaction mixture is cooled, stirred for about two hours at room temperature and the white crystalline 2-methyl-4-methoxy-α-acetamido-β-hydroxypropiophenone collected. The product is washed with water and purified, if desired, by recrystallization from benzene. This compound has the formula,

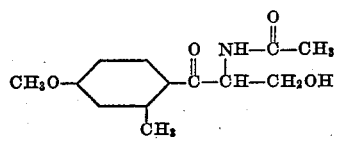

20 g. of 2-methyl-4-methoxy-α-acetamido-β-hydroxypropiophenone is dissolved in 250 cc. of ethanol and placed in a small hydrogenation bottle. 2 g. of palladium on charcoal catalyst (5%) is added and the mixture hydrogenated at 50 lbs./sq. in. pressure. When the theoretical amount of hydrogen has been absorbed, the catalyst is removed from the solution by filtration and the filtrate evaporated to dryness in vacuo. The residue which consists of a mixture of the isomeric forms of 1-(2'-methyl-4'-methoxyphenyl)-2-acetamidopropane-1,3-diol is treated with about 500 cc. of hot ethyl acetate and sufficient 95% ethanol to effect solution. The solution is cooled and the crystalline (dl)-reg.-1-(2'-methyl-4'-methoxyphenyl)-2-acetamidopropane-1,3-diol which separates collected and purified by recrystallization from hot ethanol. The formula of this product is,

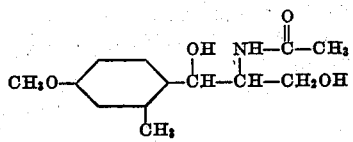

(dl)-Reg. form

The filtrate from the separation of the (dl)-reg. isomer is evaporated to dryness in vacuo and the residue which consists principally of the (dl)-ψ-1-(2'-methyl-4'-methoxyphenyl)-2-acetamidopropane-1,3-diol purified by fractional crystallization from ethanol.

Example 18

0.7 g. of sodium bicarbonate and 10 cc. of 38% aqueous formaldehyde are added to a solution consisting of 23.7 g. of 2,4-dimethoxy-ω-acetamidoacetophenone in a mixture consisting of 50 cc. of methanol and 100 cc. of water. The mixture is allowed to warm spontaneously and heated a short time, if necessary, on the steam bath to insure solution. The reaction mixture is cooled, stirred for an additional hour and the white crystalline 2,4-dimethoxy-α-acetamido-β-hydroxypropiophenone collected, washed with water and dried. If desired, this product can be purified by recrystallization from benzene. The formula of this compound is,

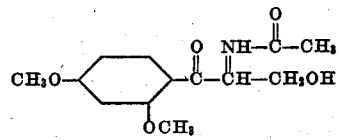

A mixture consisting of 3 g. of 2,4-dimethoxy-α-acetamido-β-hydroxypropiophenone and 6 cc. of acetic anhydride is treated with 2 drops of concentrated sulfuric acid. The resulting mixture is heated with occasional stirring at 75° C. for about twenty minutes. The clear solution is cooled, treated with a small amount of ethyl acetate and then warmed to effect solution. The solution is cooled and the crystalline 2,4-dimethoxy-α-acetamido-β-acetoxypropiophenone which separates collected, washed with ethyl acetate and purified by recrystallization from ethanol or benzene. The formula of this compound is,

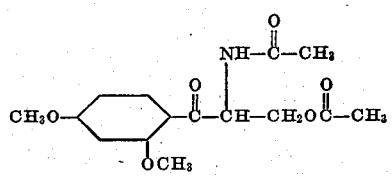

A mixture consisting of 20 g. of 2,4-dimethoxy-α-acetamido-β-hydroxypropiophenone, 28 g. of aluminum isopropylate and 200 cc. of anhydrous isopropanol is heated under reflux for about six hours. During this time the reaction mixture is blanketed with nitrogen and a small amount of the liquid distilled off and tested from time to time for acetone. The reaction mixture is treated with about 50 cc. of water, heated to boiling and filtered. The filtrate is chilled and the crystalline (dl)-ψ-1-(2',4'-dimethoxyphenyl)-2-acetamidopropane-1,3-diol which separates collected. Further quantities of the product can be obtained by concentration of the filtrate. The crude product is purified by recrystallization from water. Its formula is,

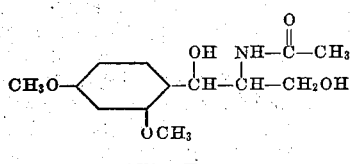

(dl)-ψ Form

Example 19

10 cc. of 38% aqueous formaldehyde is added to a solution consisting of 1 g. of sodium bicarbonate, 22.5 g. of 2-chloro-4-methyl-ω-acetamidoacetophenone, 50 cc. of 95% ethanol and 100 cc. of water. The reaction mixture is allowed to warm spontaneously and heated, if necessary, in order to effect solution. The clear solution is cooled, stirred for about an hour and the crystalline 2-chloro-4-methyl-α-acetamido-β-hydroxypropiophenone which separates collected, washed with water and dried. This product which can be purified by recrystallization from ethanol has the formula,

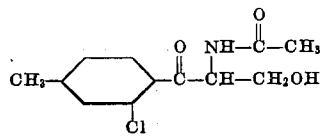

A mixture consisting of 5 g. of 2-chloro-4-methyl-α-acetamido - β-hydroxypropiophenone, 20 cc. of dry pyridine and 20 cc. of benzoyl chloride is allowed to stand at 25° C. for about twenty-four hours. The reaction mixture is poured into about 300 cc. of ice water and the crude 2-chloro-4-methyl - α - acetamido-β-benzoxypropiophenone collected and purified by recrystallization from ethanol. The formula of this product is,

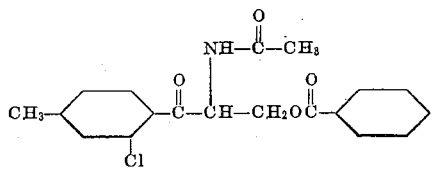

A mixture consisting of 20 g. of 2-chloro-4-methyl - α - acetamido - β - hydroxypropiophenone, 30 g. of aluminum isopropylate and 200 cc. of anhydrous isopropanol is heated under reflux for about six hours. During this time the reaction mixture is blanketed with nitrogen and a small amount of the liquid continuously distilled off. At the end of the refluxing period 50 cc. of water is added and the reaction mixture boiled for about fifteen minutes. The reaction mixture is filtered while hot and the filtrate cooled. The crystalline (dl)-ψ-1-(2'-chloro-4'-methylphenyl) - 2 - acetamidopropane-1,3 - diol which separates is collected and purified by recrystallization from water or ethanol. The formula of this product is,

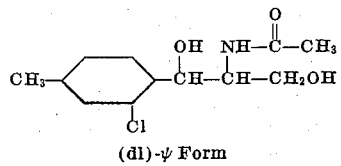

(dl)-ψ Form 5 g. of 2-chloro-4-methyl-α-acetamido-β-hydroxypropiophenone is warmed on a steam bath for about one-half hour with 100 cc. of 18% hydrochloric acid. The reaction mixture is cooled, extracted exhaustively with ethyl acetate and the aqueous phase evaporated to dryness in vacuo. The product thus obtained is the hydrochloride salt of 2-chloro-4-methyl-α-amino-β-hydroxypropiophenone. Recrystallization from absolute ethanol yields the pure white crystalline salt. This product has the formula,

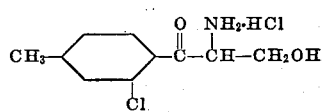

Example 20

19 g. of 4-methyl-ω-acetamidoacetophenone is dissolved in 50 cc. of methanol and 100 cc. of water added to the solution. 10 cc. of 38% aqueous formaldehyde solution and 9 cc. of 4 N sodium carbonate solution are added and the resulting mixture allowed to warm spontaneously. As soon as the solution becomes clear the reaction mixture is cooled, allowed to stand for about one hour and the desired white crystalline 4-methyl-α-acetamido - β - hydroxypropiophenone collected. Recrystallization from benzene yields the pure product melting at 120–22° C. This compound has the formula,

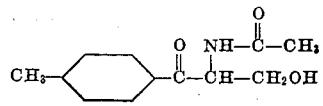

22.1 g. of 4-methyl-α-acetamido-β-hydroxypropiophenone is dissolved in 250 cc. of ethanol and 2 g. of palladium on charcoal hydrogenation catalyst is added. The mixture is placed in a small hydrogenation bottle, a small amount of water added and the mixture hydrogenated at 50 lbs. pressure of hydrogen at room temperature until 8 lbs. of hydrogen have been absorbed. The catalyst is removed by filtration and the filtrate evaporated to dryness in vacuo. The residue is treated with 500 cc. of hot ethyl acetate and sufficient ethanol to effect solution. Upon cooling the (dl)-reg.-1-(4'-methylphenyl)-2-acetamidopropane-1,3-diol separates from the solution. This product which can be purified by recrystallization from ethanol has the formula,

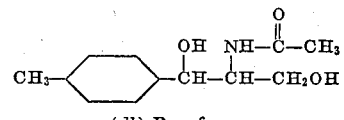

(dl)-Reg. form and melts at 175–77° C. when pure.

The filtrate from the separation of the (dl)-reg. isomer is evaporated to dryness in vacuo and treated with 170 cc. of hot ethanol. Upon cooling to room temperature an additional 2 g. of the (dl)-reg. isomer separates. The (dl)-reg. isomer is removed by filtration and the filtrate cooled in a refrigerator overnight. The crystalline (dl)-ψ-1 - (4' - methylphenyl) - 2 - acetamidopropane-1,3-diol which has separated from the cold solution is collected; M.P. 142–6° C.

A mixture consisting of 3 g. of p-methyl-α-acetamido - β - hydroxypropiophenone, 6 cc. of acetic anhydride and 3 drops of concentrated sulfuric acid is heated on a steam bath at 80° C. for twenty minutes. The clear solution is cooled, diluted with about 10 cc. of ethyl acetate and then warmed to effect solution. The solution is allowed to cool and the crystalline 4-methyl-α-acetomido-β-acetoxypropiophenone which separates collected, washed with ethyl acetate and purified by recrystallization from ethyl acetate. The formula of this compound is,

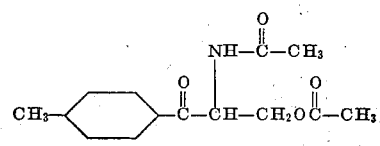

Example 21

1 g. of sodium bicarbonate and 10 cc. of 38% formaldehyde are added to a solution consisting of 24 g. of 3,4-dimethoxy-ω-dichloroacetamidoacetophenone in 150 cc. of 70% ethanol. The mixture is allowed to react spontaneously and then heated for a short time, if necessary, on a steam cone in order to insure complete solution. The reaction mixture is cooled, stirred for an additional hour and the white crystalline 3,4-dimethoxy - α - dichloroacetamido - β - hydroxypropiophenone collected. If desired, this product can be purified by recrystallization from methanol. Its formula is,

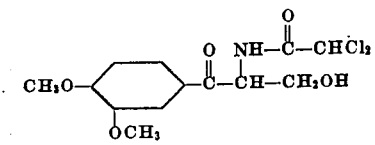

A mixture consisting of 3 g. of 3,4-dimethoxy-α-dichloroacetamido-β-hydroxypropiophenone, 6 cc. of acetic anhydride and a few drops of concentrated sulfuric acid is heated at 75° C. for a few minutes. The clear reaction mixture is cooled, diluted with ethyl acetate and then heated to effect solution. The warm mixture is cooled and the crystalline 3,4-dimethoxy-α-dichloroacetamido-β-acetoxypropiophenone collected and purified, if desired, by recrystallization from methanol. The formula of this product is,

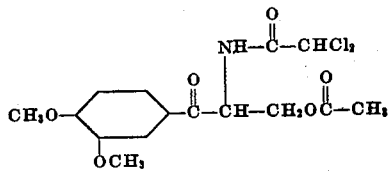

A mixture consisting of 20 g. of 3,4-dimethoxy-α-dichloroacetamido-β-hydroxypropiophenone, 30 g. of aluminum isopropylate and 250 cc. of dry isopropanol is heated under reflux for about six hours. During this time a small amount of the reaction mixture is continuously removed by distillation and tested for acetone. The reaction mixture is also blanketed with nitrogen during the refluxing period. 25 cc. of water is added to the reaction mixture, the mixture heated to boiling, cooled and filtered. The aluminum hydroxide precipitate is washed with aqueous isopropanol until the extracts are colorless. Concentration of the combined filtrate and extracts yields the desired crystalline (dl)-ψ-1-(3',4-dimethoxyphenyl)-2-dichloroacetamidopropane-1,3-diol. This product can be purified by recrystallization from methanol. The formula of this product is,

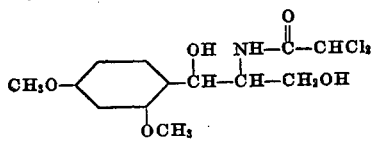

The ω-acyl-aminoacetophenone derivatives used as starting materials in the practice of the invention can be prepared in several different ways. One of the most satisfactory methods is that described by Lister and Robinson [J. Chem. Soc., 101, 1297 (1912)] for the preparation of ω-benzoylaminoacetophenone. This involves the conversion of acetophenone to phenylglyoxal, aldoxime followed by reduction with stannous chloride and benzoylation with benzoyl chloride. Another method of preparing these starting materials involves the reduction of an ω-nitroacetophenone followed by acylation of the ω-aminoacetophenone obtained on reduction.

What I claim is:

1. A compound of the formula,

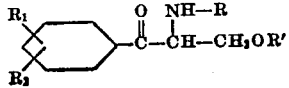

where R is a member of the class consisting of hydrogen and carboxylic acid acyl radicals, $R_1$ and $R_2$ are members of the class consisting of hydrogen, halogen, lower alkyl and lower alkoxy radicals and R' is a member of the class consisting of hydrogen and carboxylic acid acyl radicals.

2. A compound of the formula,

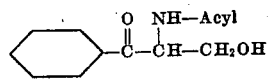

said Acyl being a carboxylic acid acyl radical.

3. A compound of the formula,

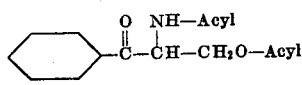

said Acyl being a carboxylic acid acyl radical.

4. A compound of the formula,

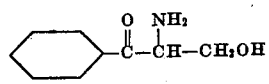

5. A compound of the formula,

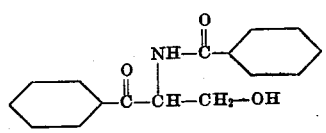

6. A compound of the formula,

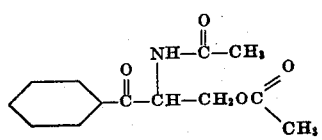

7. A compound of the formula,

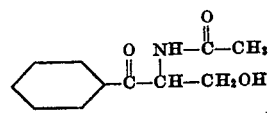

8. Process which comprises condensing a compound of formula,

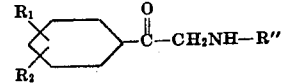

with formaldehyde in the presence of an alkaline condensation catalyst to obtain a compound of formula,

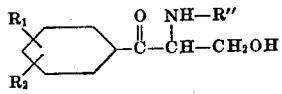

where R'' is a carboxylic acid acyl radical and $R_1$ and $R_2$ are members of the class consisting of hydrogen, halogen, lower alkyl and lower alkoxy radicals.

LOREN M. LONG.

No references cited.